US00RE39891E

(19) United States
(12) Reissued Patent
Pickelman et al.

(10) Patent Number: US RE39,891 E
(45) Date of Reissued Patent: Oct. 23, 2007

(54) V-BLADE IMPELLER DESIGN FOR A REGENERATIVE TURBINE

(75) Inventors: Dale M. Pickelman, Marshall, MI (US); John Gardner Fischer, Goodrich, MI (US)

(73) Assignee: Delphi Technologies, Inc., Troy, MI (US)

(21) Appl. No.: 10/821,281

(22) Filed: Apr. 8, 2004

Related U.S. Patent Documents

Reissue of:
(64) Patent No.: 6,439,833
Issued: Aug. 27, 2002
Appl. No.: 09/652,542
Filed: Aug. 31, 2000

(51) Int. Cl.
*F04D 1/04* (2006.01)

(52) U.S. Cl. ..... 415/55.1; 416/237
(58) Field of Classification Search ..... 415/55.1, 415/55.2, 55.3, 55.4, 55.5, 55.6, 55.7; 416/223 R, 416/223 A; 417/423.3
See application file for complete search history.

(56) References Cited

U.S. PATENT DOCUMENTS 5,299,908 A * 4/1994 Robbie ..... 415/55.1
5,372,475 A * 12/1994 Kato et al. ..... 415/55.1
5,527,149 A 6/1996 Moss et al.
5,762,469 A * 6/1998 Yu ..... 415/55.1
5,807,068 A * 9/1998 Dobler et al. ..... 415/55.1
6,497,552 B2 * 12/2002 Kobayashi et al. ..... 415/55.1

FOREIGN PATENT DOCUMENTS

GB 2253010 A * 8/1992
JP 57005594 A * 1/1982
JP 57081191 A * 5/1982

* cited by examiner

*Primary Examiner*—Richard A. Edgar
(74) *Attorney, Agent, or Firm*—Paul L. Marshall

(57) ABSTRACT

A novel impeller for a regenerative turbine fuel pump improves the efficiency of the pump and yet still retains a geometry that allows it to be manufactured by conventional injection molding techniques at a relatively low cost. The impeller comprises a hub, an outer ring and a plurality of innovative V-shaped vanes. The hub defines an aperture into which the shaft of the pump is securable to allow the hub to rotate about a center axis. The outer ring is concentric to the hub. The vanes extend from an outer surface of the hub to an inner surface of the outer ring. Each vane comprises an entrance portion that extends from the outer surface of the hub and an exit portion that extends from the entrance portion to the inner surface of the outer ring. Each vane has a V-shape of a prespecified angle centered relative to a plane normal to the center axis. Each vane is also at least partially non-linear on at least one of an upstream face and downstream face of the vane from the entrance portion thereof through the exit portion thereof. Each outer sidewall of each entrance portion is also chamfered along its trailing corner. The chamfer is made at a predetermined angle relative to the aforementioned plane.

52 Claims, 6 Drawing Sheets

V-BLADE IMPELLER DESIGN FOR A REGENERATIVE TURBINE

Matter enclosed in heavy brackets [ ] appears in the original patent but forms no part of this reissue specification; matter printed in italics indicates the additions made by reissue.

FIELD OF THE INVENTION

The invention relates generally to regenerative turbine pumps of the type that are used to pump fuel from a fuel tank to an engine of a motor vehicle. More particularly, the invention pertains to an impeller whose blades are designed to improve substantially the flow of fuel within a regenerative turbine fuel pump, as compared to the type of prior art blade designs typical of the impellers currently in use in the industry.

BACKGROUND OF THE INVENTION

The following background information is provided to assist the reader to understand the environment in which the invention will typically be used. Upon reading this document, the reader will appreciate that the invention may also be applied or adapted to environments other than that described below.

As used in the fuel system of a motor vehicle, a regenerative turbine pump is intended to provide the engine of the vehicle with fuel at relatively high pressure at moderate flow rates. U.S. Pat. Nos. 5,580,213, 5,509,778, 5,393,206, 5,393,203, 5,280,213, 5,273,394, 5,209,630, 5,129,796, 5,013,222 and 4,734,008 are generally representative of the variety of regenerative turbine fuel pumps used in the automotive industry. The teachings of these earlier patents are therefore incorporated into this document by reference.

FIGS. 1–6 illustrate one type of regenerative turbine fuel pump, generally designated 10, along with its associated structure and internal components. This regenerative turbine pump 10 is housed within a tubular metal shell 14, also referred to in the literature as a pump housing. Encased within this metal shell 14 is an electric motor 18. The motor 18 is built around an armature shaft 20, as is well known in the art, and is positioned within the housing 14 so that the shaft 20 can be rotated about a longitudinal center axis 4. Projecting from one end of the housing 14 is a terminal 11. It is through this terminal 11 via a wiring harness (not shown) on the vehicle that electrical energy can be supplied to the electric motor 18.

As best shown in FIGS. 1 and 2, an impeller 12 is mounted to one end of the shaft 20. The impeller 12 is situated between a pair of generally cylindrical plates 22a and 22b. Between the plates 22a and 22b there is defined a generally disk-shaped space 24 within which the impeller 12 is designed to rotate. This space 24 is best shown in FIG. 4. An annular groove 23a in the inside face of outer plate 22a cooperates with an annular groove 23b in the outside face of inner plate 22b to form an annular pump channel 23. As best shown in FIGS. 3 and 4, the outer plate 22a also defines an inlet port 34 that communicates with annular groove 23a. Similarly, the inner plate 22b defines an outlet port 36 that communicates with annular groove 23b.

The fuel tank of the vehicle communicates with the annular pump channel 23 through the inlet port 34 in outer plate 22a. This communication occurs through the annular groove 23a on the inlet side of impeller 12, as well as through known passageway(s) internal to fuel pump 10. The pump housing 14 has a discharge tube 48 to which the outlet port 36 is connected via other known passageway(s) within the fuel pump 10. Through outlet port 36, discharge port 48 communicates with the annular pump channel 23 on the outlet side of impeller 12, i.e., through annular groove 23b. It is from this discharge tube 48 that pressurized fuel is discharged from and delivered by the fuel pump 10 for use by the engine of the vehicle.

The impeller 12 serves as the rotary pumping element for the regenerative turbine pump 10. As shown in FIGS. 1–5, the impeller 12 basically takes the form of a disk having a hub 26 whose axis of rotation is centered on center axis 4. The hub 26 defines an aperture 28 at its center. The aperture 28 is notched, to accommodate the like-shaped shaft 20 of motor 18. The notched aperture 28 allows the shaft 20 to drive the impeller 12 when the electrical motor 18 is activated.

The impeller 12 has a plurality of fan blades 30 that project radially outward from the hub 26. Also referred to as vanes, the fan blades 30 are generally spaced from each other uniformly. As best shown in FIGS. 4–6, each of the vanes 30 is V-shaped. Radiating from the periphery of hub 26, the vanes 30 are situated in between and adjacent to the annular grooves 23a and 23b in outer and inner plates 22a and 22b, respectively. In other words, the vanes 30 are positioned directly within the annular pump channel 23 of the regenerative turbine pump 10.

FIGS. 5 and 6 illustrate the structure of the vanes 30. Each V-shaped blade 30 has a pair of fin members 30a and 30b, each having a generally rectangular cross-section. The base of each fin member emanates from the hub 26. Each fin member 30a and 30b lies at angle of approximately 45° with respect to a plane of intersection 5 that bisects impeller 12 longitudinally. This plane appears as a line in FIG. 6, as two fan blades 30 of impeller 12 are viewed therein from the top. The inner sidewalls 31a and 31b of fin members 30a and 30b are formed together along the plane 5 during the injection molding process that is used to manufacture the impeller 12. From their adjoined inner sidewalls, the fin members of each vane 30 diverge away from each other. These adjoined fin members 30a and 30b together form upstream and downstream faces. Facing the direction of rotation 6, the upstream face of each vane 30 is generally concave, exhibiting an angle of approximately 90°. The downstream face is convex, exhibiting a similar angle on the back side of vane 30. Each vane 30 also has two generally flat outer sidewalls 32a and 32b. Fin member 30a has outer sidewall 32a and fin member 30b has outer sidewall 32b.

FIG. 5 best illustrates how the vane(s) 30 are oriented with respect to, and are moved within, the annular pump channel 23. FIG. 5 shows the annular groove 23a in the inside face of outer plate 22a. The annular groove 23b in the outside face of inner plate 22b is best shown in FIG. 2. Outer sidewall 32a lies directly adjacent to annular groove 23a, and outer sidewall 32b lies adjacent to annular groove 23b. The vanes 30 of impeller 12 thus lie within the annular pump channel 23 that is defined by annular grooves 23a and 23b. In addition, as shown in FIG. 5, each vane 30 can be considered as having an entrance portion 37 and an exit portion 38. The entrance portion 37 extends generally from the hub 26 to midpoint of annular pump channel 23. Shaded in FIG. 5, the exit portion 38 extends from the midpoint to the distal end of the vane. Each vane 30 thus extends radially outward from the hub 26.

The regenerative turbine fuel pump 10 operates as follows. When electricity is supplied via terminal 11 to the electric motor 18, the armature shaft 20 immediately begins to rotate. The rotation of shaft 20, in turn, causes the impeller 12 to rotate within the disk-shaped space 24 between the inner and outer plates 22a and 22b. Fuel from the fuel tank is sucked into the inlet port 34 and flows into the annular groove 23a, and thus into the annular pump channel 23.

The rotation of the impeller 12 imparts both a centrifugal and a tangential force on the fuel. As the impeller 12 rotates, its V-shaped vanes 30, in combination with annular grooves 23a and 23b on either side, cause the fuel to whirl about the annular pump channel 23 in a toroidal flow path, as is best shown in FIG. 5. More specifically, the centrifugal force moves the fuel with velocity in the radial direction with respect to hub 26. This causes the fuel to traverse the length of each blade 30, i.e., fuel enters the base of each vane flowing from the root along entrance portion 37 and exit portion 38 and exits the tip. As it enters annular pump channel 23, the fuel is redirected by the walls of the channel 23, causing it to circle or spiral back towards the root of the trailing vane. This cycle is repeated continuously as the impeller 12 rotates.

As is known in the art, this regenerative cycle of exiting the tip of the leading blade 30 and entering the base of the trailing blade 30 occurs many times as the fuel is conveyed through the annular pump channel 23 by the vanes 30 on the periphery of the rotating impeller 12. Each regenerative cycle thus imparts a generally circular (radial) velocity to the fuel.

The combined geometry of the annular pump channel 23 and the vanes 30 of the impeller ultimately cause the fuel to flow within, and in a direction that is tangential to, the annular pump channel 23. The collective action of the blades 30 thus imparts a tangential velocity to the fuel. The combination of the circulatory and tangential velocities causes the fuel to flow in a toroidal pattern within the annular pump channel 23. The tangential velocity with which the fuel flows in the direction of rotation 6 is generally characterized by $V_t=R\overline{\omega}$, where R is the radius or distance from the center of hub 26 and $\overline{\omega}$ is the angular velocity (i.e., the rate of change of angular displacement with respect to time).

As fuel exits the tip of each vane and enters the annular pump channel 23, angular or tangential momentum is transferred to the fuel. This gives rise to the tangential velocity with which the fuel is carried toward the outlet port 36 defined in inner plate 22b. From the outlet side of impeller 12 (i.e., through annular groove 23b), the flowing fuel then exits through the outlet port 36. The fuel continues flowing through the internal passageway(s) of the pump housing 14 and exits the fuel pump 10 through discharge port 48. In this known manner, fuel at relatively high pressure is provided to the engine of the motor vehicle at an appropriate rate of flow.

With its V-shaped vanes 30, the impeller 12 is, of course, the rotary pumping element that is responsible for increasing the momentum of the fuel with each regenerative cycle. The efficiency of the turbine fuel pump 10, however, is limited by the non-streamlined design of the vanes. The current design of the vanes causes some of the energy to be lost from the flow of fuel. In particular, the impeller 12 has at least three design limitations that lessen the angular momentum being imparted to the fuel as it flows within the annular pump channel 23.

The first design limitation involves the downstream face of each vane 30. Specifically, some energy in the stream of fuel is lost behind each blade 30 due to the separation of the fluid stream and the low pressure area resulting therefrom. The area where this energy loss occurs is depicted at $L_1$ in FIG. 6, generally just behind the trailing corner 33 of each fin member.

The second design limitation involves the upstream face of the vanes 30. In particular, the flow of fuel loses energy at the point at which the fuel impacts the leading corners of each fan blade 30. The area where this energy loss occurs is depicted at $L_2$ in FIG. 6. The combined losses due to separation and low pressure behind each blade 30 and impact of the fuel on the forward facing corners of each blade 30 serve not only to decrease the rate at which the fuel flows but also the pressure at which the fuel is provided to the engine.

The third design limitation involves the configuration of the entrance and exit portions 37 and 38 of the fan blades 30. The entrance and exit portions of each vane, as currently configured, direct the fuel to flow in the radial direction only, with respect to hub 26, from the root of the vane to the tip. Consequently, the angular momentum of the fuel as it flows within the annular pump channel 23 would be increased if the fuel were to exit from the exit portion 38 in a direction that is more tangential with respect to the annular pump channel 23. In addition, because the vanes extend radially outward from hub 26, the fuel as it enters the root of each vane 30 loses energy at the point at which it impacts the entrance portion 37.

OBJECTIVES OF THE INVENTION

It is, therefore, an objective of the invention to provide a novel impeller whose V-shaped vanes improve substantially the flow of fuel within a regenerative turbine fuel pump.

A related objective is to provide an impeller whose specially configured dual-angled V-shaped vanes impart greater momentum to the fuel flowing within the annular pump channel of a regenerative turbine fuel pump.

Another related objective is to provide an impeller whose specially configured curve-surfaced or "hooked" V-shaped vanes impart greater momentum to the fuel flowing within the annular pump channel of a regenerative turbine fuel pump.

A further objective is to provide an impeller for a regenerative turbine pump that minimizes energy losses associated with the circulatory flow of the fuel impacting against the forward faces of the vanes as well as energy losses caused by the separation of the fuel stream behind the vanes.

A related objective is to provide an impeller whose vanes are designed to reduce the amount of energy lost from the fuel stream by minimizing the separation of the fuel stream behind each vane and the development of a low pressure area thereat.

Another related objective is to provide an impeller whose vanes are designed to reduce the amount of energy lost from the fuel stream by lessening the force with which the circulating fuel stream impacts the forward faces and corners of each vane.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the accompanying drawings and claims.

SUMMARY OF THE INVENTION

The foregoing objectives and advantages are attained by a novel impeller for a regenerative turbine fuel pump. The fuel pump for which the impeller is designed should have an electrical motor and a shaft rotatable thereby about a center axis. In a generic manifestation, the novel impeller comprises a hub, an outer ring and a plurality of innovative V-shaped vanes. At its center, the hub defines an aperture into which the shaft of the fuel pump is securable to allow the hub to rotate with the shaft about the center axis. The outer ring is concentric to the hub. The vanes extend from an outer surface of the hub to an inner surface of the outer ring. Each vane comprises an entrance portion that extends from the outer surface of the hub and an exit portion that extends from the entrance portion to the inner surface of the outer ring. Each vane has a V-shape of a prespecified angle centered relative to a plane normal to the center axis. Each vane is also at least partially non-linear on at least one of an upstream face and downstream face of the vane from the entrance portion thereof through the exit portion thereof. The entrance and exit portions of each vane each have a pair of outer sidewalls. Each outer sidewall of each entrance portion is chamfered along a trailing corner thereof. The chamfer is made at a predetermined angle relative to the aforementioned plane.

In a first presently preferred embodiment, the entrance portion of each V-shaped vane extends linearly outward from the outer surface of the hub. In addition, the exit portion of each vane is inclined forward of the entrance portion. In particular, the exit portion is inclined forward so that it is oriented toward the inner surface of the outer ring at an exit angle with respect to a direction of rotation of the impeller. The exit angle preferably lies within a range of 15° to 50°.

In a second presently preferred embodiment, each V-shaped vane is curved from the outer surface of the hub to the inner surface of the outer ring. More specifically, the entrance portion is oriented so that it draws away from the outer surface at an entrance angle with respect to a direction of rotation of the impeller. The exit portion is oriented so that it advances toward the inner surface at an exit angle with respect to the direction of rotation. The entrance angle preferably lies within a range of 5° to 30°, and the exit angle preferably lies within a range of 15° to 50°.

DETAILED DESCRIPTION OF THE INVENTION

Figure 1:
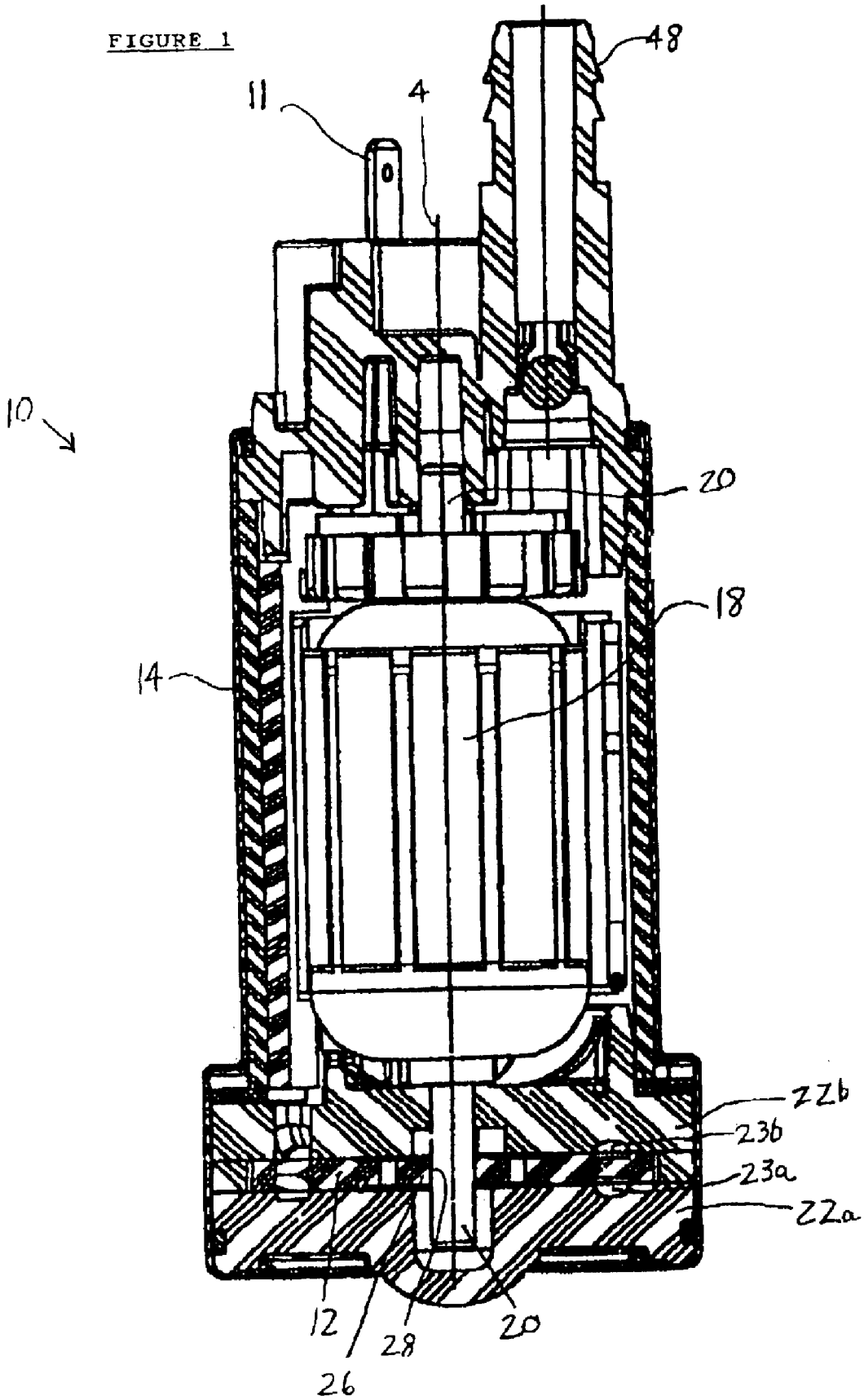
FIG. 1 is a cross-sectional side view of a conventional regenerative turbine fuel pump, showing an impeller attached to the end of a shaft of an electric motor.

Before describing the invention in detail, the reader is advised that, for the sake of clarity and understanding, identical components having identical functions have been marked where possible with the same reference numerals in each of the Figures provided in this document.

Figure 2:
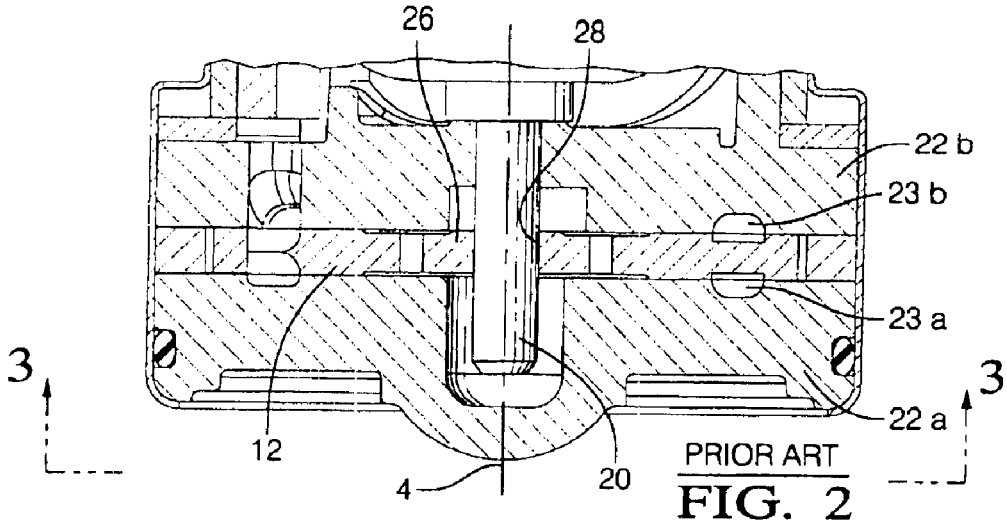
PRIOR ART FIG. 2
FIG. 2 is an enlarged view of the lower end of the regenerative turbine fuel pump shown in FIG. 1, showing more clearly the impeller attached to the end of the shaft.

FIGS. 7–14 illustrate the essential details of the invention, namely, a novel impeller 212 for a regenerative turbine fuel pump 10. The regenerative turbine fuel 10 for which the impeller 212 is designed will generally include an electric motor 18, a shaft 20, a generally cylindrical outer plate 22a and a generally cylindrical inner plate 22b. FIGS. 1 and 2 show that the shaft 20 is rotatable by the motor 18 about a center axis 4 in a forward direction 6. They also show that the outer plate 22a has an inside face that defines a first annular groove 23a. Similarly, the inner plate 22b has an outside face that defines a second annular groove 23b.

Figure 3:
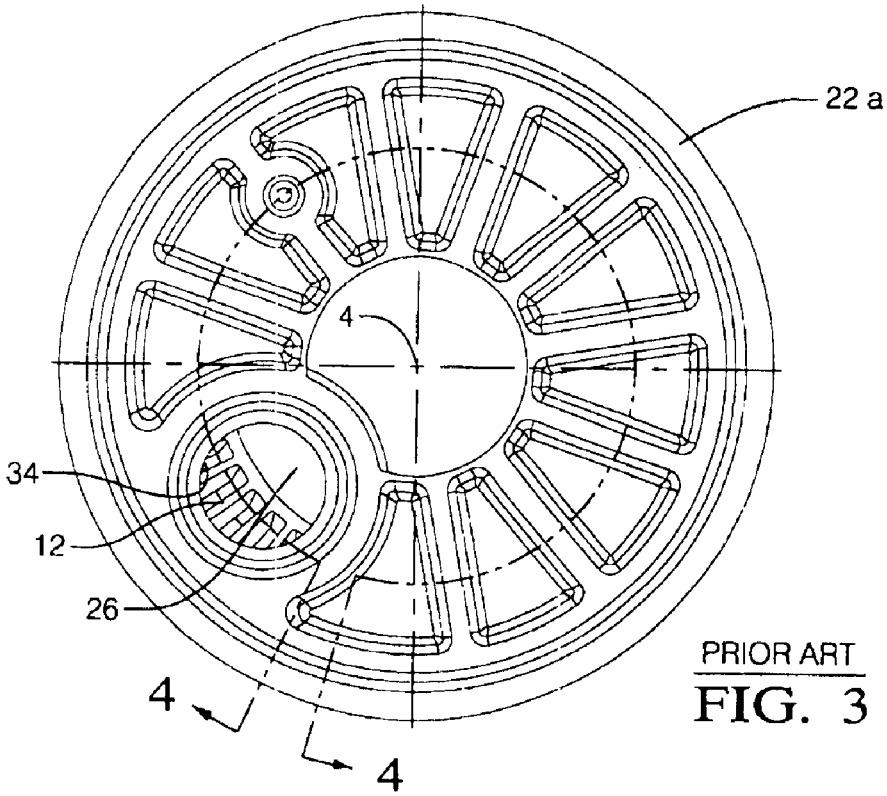
PRIOR ART FIG. 3
FIG. 3 is a sectional view taken generally along the plane indicated by lines A—A in FIG. 2, showing the vanes of the impeller through an inlet port defined in an outlet plate.
Figure 4:
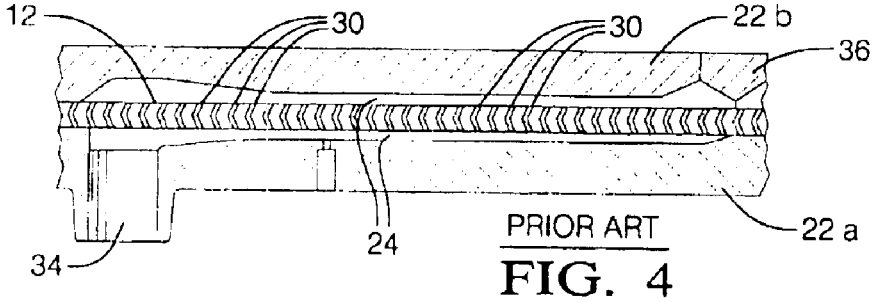
PRIOR ART FIG. 4
FIG. 4 is an enlarged sectional view taken generally along the perimeter indicated by lines B—B in FIG. 3, showing the relationship between the V-shaped vanes of a prior art impeller and the inlet and outlet ports defined within the outer and inner plates, respectively, of the fuel pump.

The first and second annular grooves 23a and 23b cooperate to form an annular pump channel 23 at a periphery of a disk-shaped space 24 defined between the inner and outer plates 22b and 22a, as best shown in FIGS. 3 and 4. Outer plate 22a further defines an inlet port 34 that communicates with the first annular groove 23a. Similarly, inner plate 22b defines an outlet port 36 that communicates with second annular groove 23b.

Figure 9:
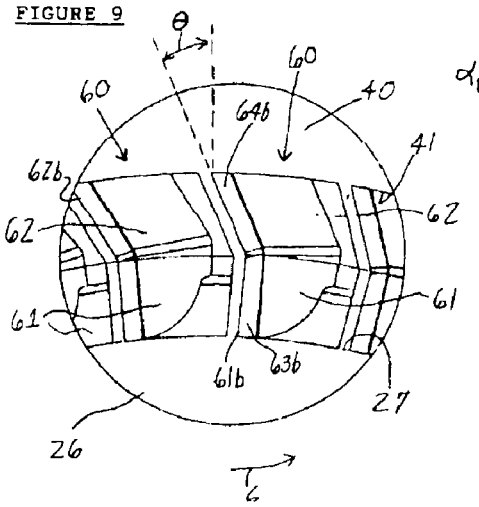
FIG. 9 is an enlarged view of a section of the impeller, indicated by circle B in FIG. 7, showing the exit and entrance portions of several of the dual-angled V-shaped vanes.
Figure 11:
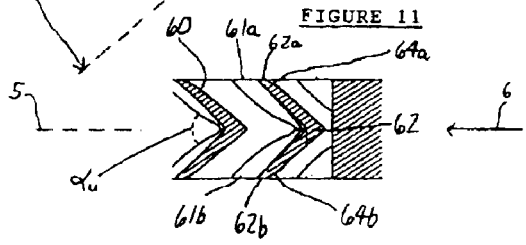
FIG. 11 is an enlarged, partial sectional view taken generally along the plane indicated by lines D—D in FIG. 7, showing various partial portions of several V-shaped vanes.
Figure 12:
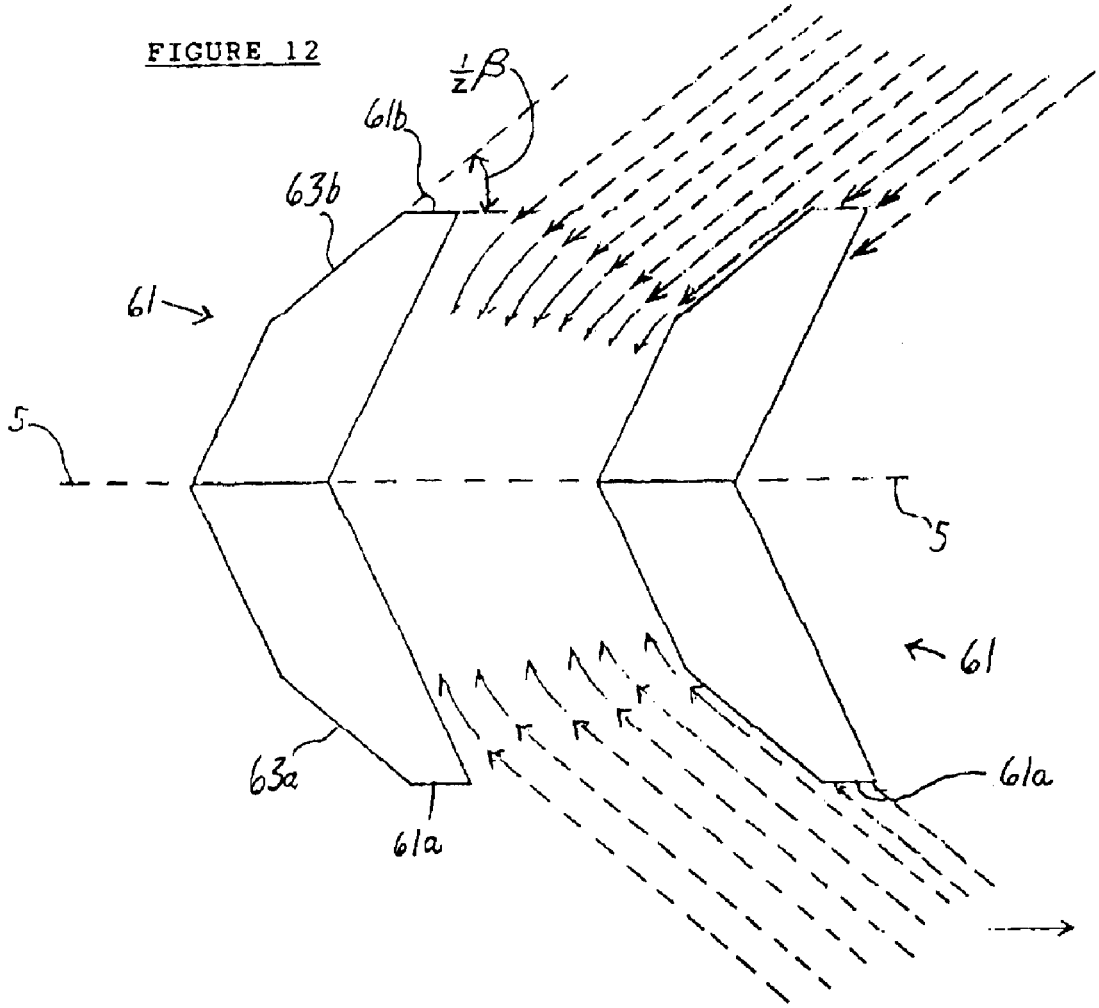
FIG. 12 is an enlarged top sectional view of the entrance portion of two adjacent vanes of the impeller shown in FIG. 7, showing the chamfer on the trailing corners of the entrance portion of each vane and how the fuel flows therearound.
Figure 13:
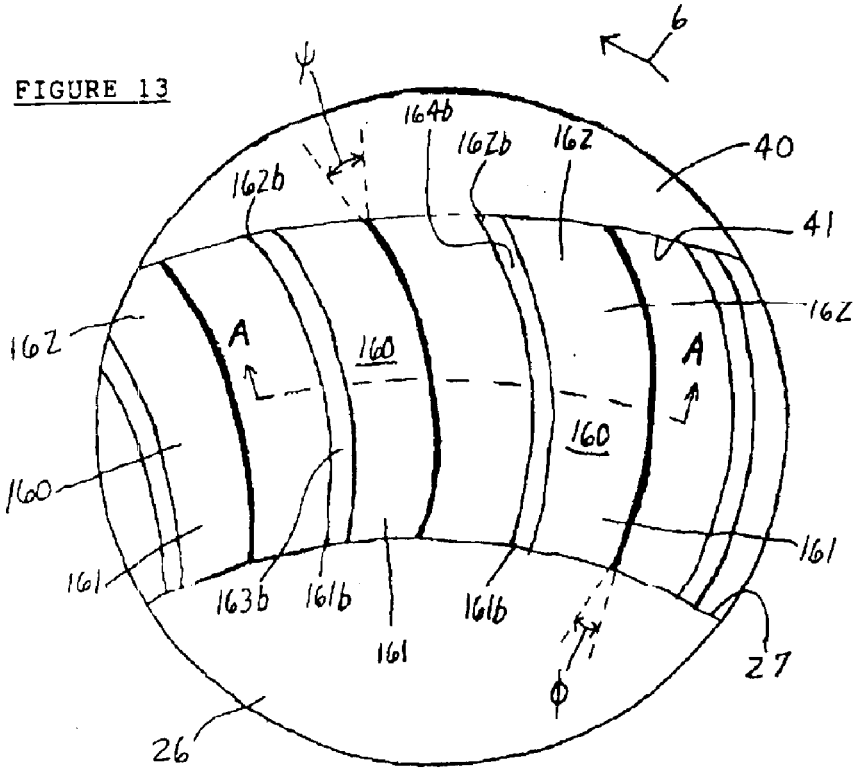
FIG. 13 is an enlarged view of a section of a closed-vane impeller showing the novel curved-surfaced or "hooked" V-shaped vanes according to a second embodiment of the invention.

Two presently preferred embodiments of the invention, namely, the dual-angled and curved-surfaced embodiments, are shown in FIGS. 7–12 and 13–14, respectively. In both embodiments, the impeller 212 comprises a hub 26, an outer ring 40 and a plurality of innovative V-shaped vanes 60/160, as best shown in FIGS. 9 and 13, respectively. The hub 26, the outer ring 40 and the V-shaped vanes 60/160 can be formed on a single part by use of an injection molding process. Several injection molding processes are well known in the industry. The molding process used to make the prior art impeller 12 is one such known process, but it has heretofore not been used to make an impeller 212 having the novel features disclosed in this document.

The hub 26 has a cylindrical outer surface 27. The hub 26 also defines an aperture 28 into which the shaft 20 can be secured. This allows the impeller 212 to rotate with shaft 20 about the center axis 4 in the forward direction 6, when motor 18 is supplied with electricity via the terminal 11 that protrudes from the pump housing 14. Concentric to hub 26, the outer ring 40 has a cylindrical inner surface 41.

During the injection molding process, the vanes 60/160 are formed on the hub 26 so that they extend from the outer surface 27 of hub 26 to the inner surface 41 of outer ring 40. In terms of operation, each V-shaped vane 60/160 can be considered to have an entrance portion 61/161 and an exit portion 62/162, as best shown in FIGS. 9 and 13. In particular, the entrance portion 61/161 of each vane extends from the outer surface 27 of hub 26, and the exit portion 62/162 extends from the entrance portion 61/161 to the inner surface 41 of outer ring 40.

Figure 10:
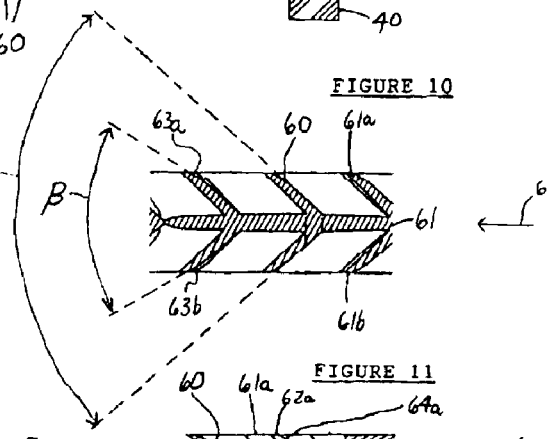
FIG. 10 is an enlarged, partial sectional view taken generally along the plane indicated by lines C—C in FIG. 7, showing the entrance portion of several of the V-shaped vanes.

Each vane 60/160 has a V-shape of a prespecified angle $\alpha$ centered relative to a plane 5 normal to the center axis 4. Although only shown for the dual-angled embodiment in FIGS. 10 and 11, the prespecified angle $\alpha$ also applied to the curved-surfaced embodiment. For the upstream face of each vane, the prespecified angle $\alpha_U$ lies within a range of 50° and 130°, as shown in FIG. 11. Preferably, $\alpha_U$ is 90°. For the downstream face, as best shown in FIG. 10, the prespecified angle $\alpha_D$ ideally lies within a range of 80° and 86°, with 82.3° being the preferred value. Stated in another way, the fin members of each vane 60/160 diverge from each other on their upstream and downstream faces by angles $\alpha_U$ and $\alpha_D$, respectively.

Figure 14:
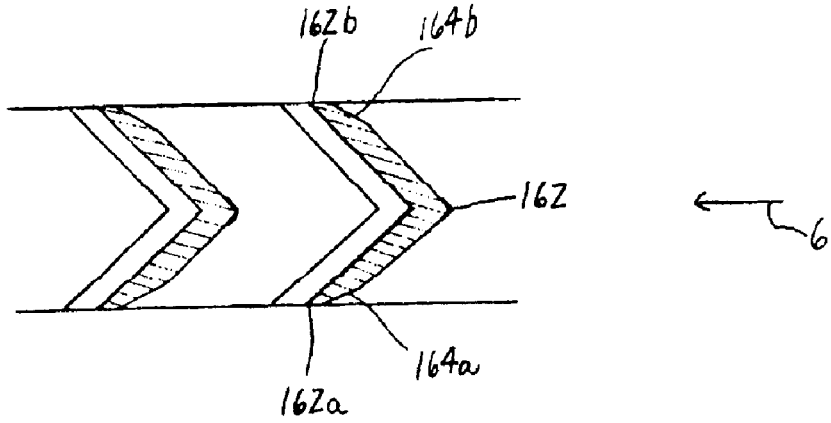
FIG. 14 is a sectional view taken generally along the plane indicated by lines A—A in FIG. 13.

Still describing each embodiment generically, each vane 60/160 is also at least partially non-linear on either of its upstream face or downstream face or both from the entrance portion 61/161 through the exit portion 62/162. In addition, the entrance and exit portions of each vane 60/160 each have a pair of outer sidewalls. More specifically, the outer sidewalls 61a and 61b of the entrance portions 61 for the dual-angled embodiment are best shown in FIGS. 9, 10 and 12. The outer sidewalls 62a and 62b of the exit portions 62 are best shown in FIGS. 9 and 11. Similarly, the outer sidewalls 161a and 161b of the entrance portions 161 for the curved-surface embodiment are best shown in FIG. 13. The outer sidewalls 162a and 162b of the exit portions 162 are shown in FIGS. 13 and 14. As described in further detail below, along their respective trailing corners, the outer sidewalls of at least the entrance portions 61/161 of the vanes 60/160 are chamfered at a predetermined angle $\beta$ relative to plane 5.

Figure 5:
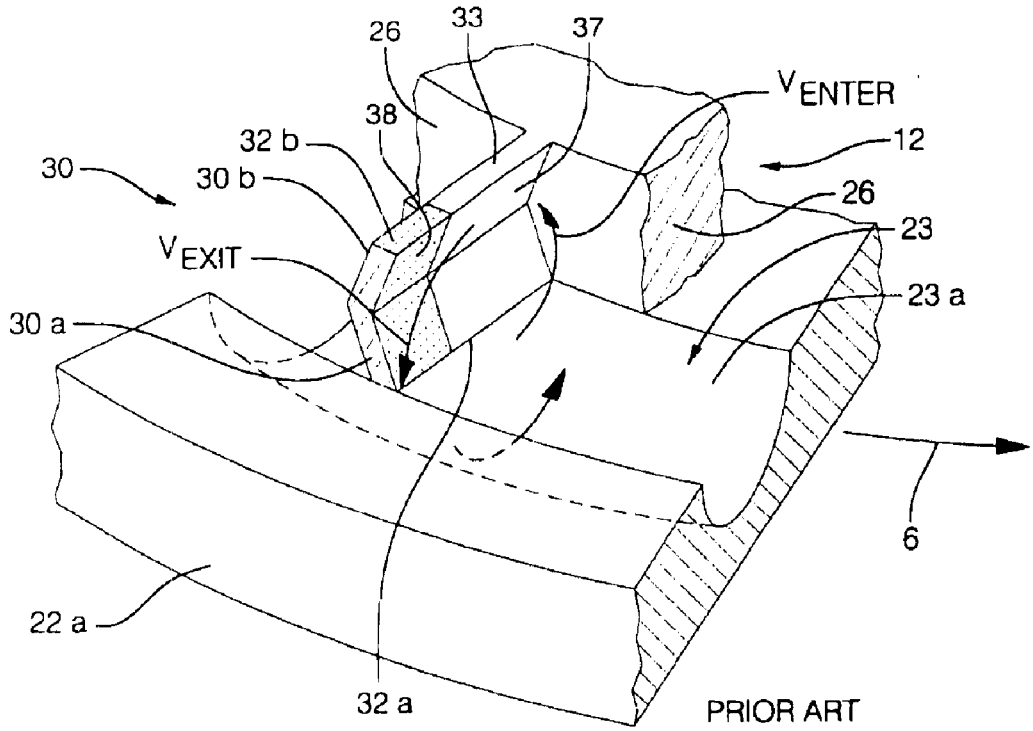
PRIOR ART FIG. 5
FIG. 5 is a partial three-dimensional view of the outer plate and the prior art impeller, showing how the V-shaped vanes are oriented with respect to the annular pump channel.
Figure 6:
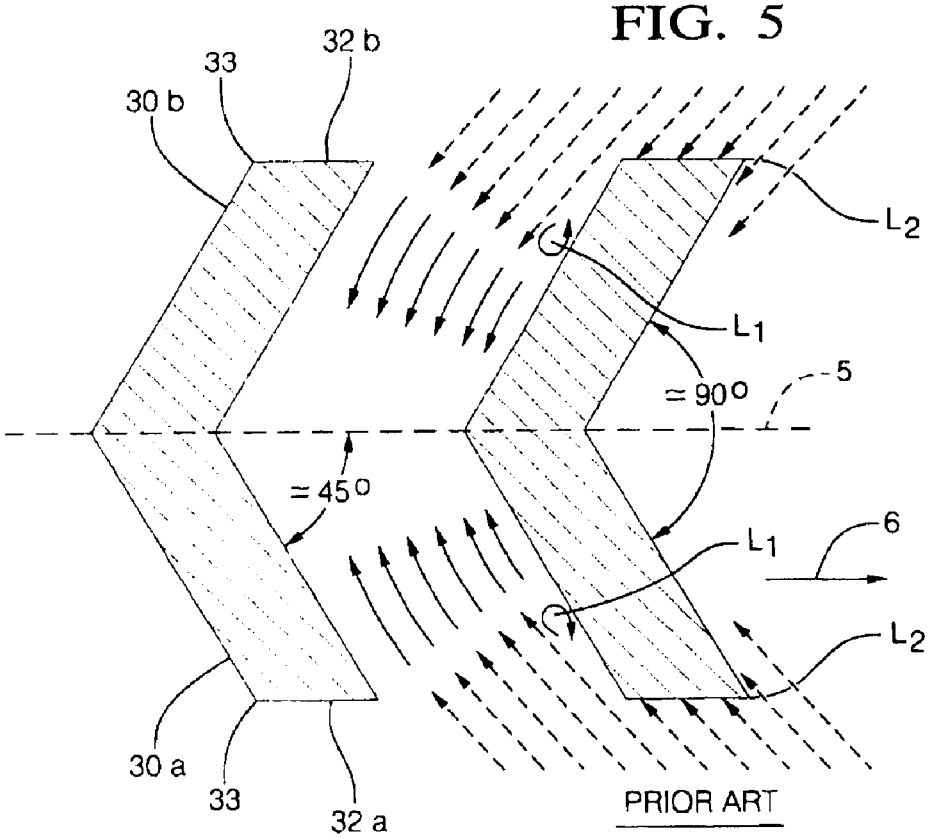
PRIOR ART FIG. 6
FIG. 6 is an enlarged top view of two adjacent V-shaped vanes of the prior art impeller, showing how the fuel stream flows into and then around the fin members of the leading vane.
Figure 7:
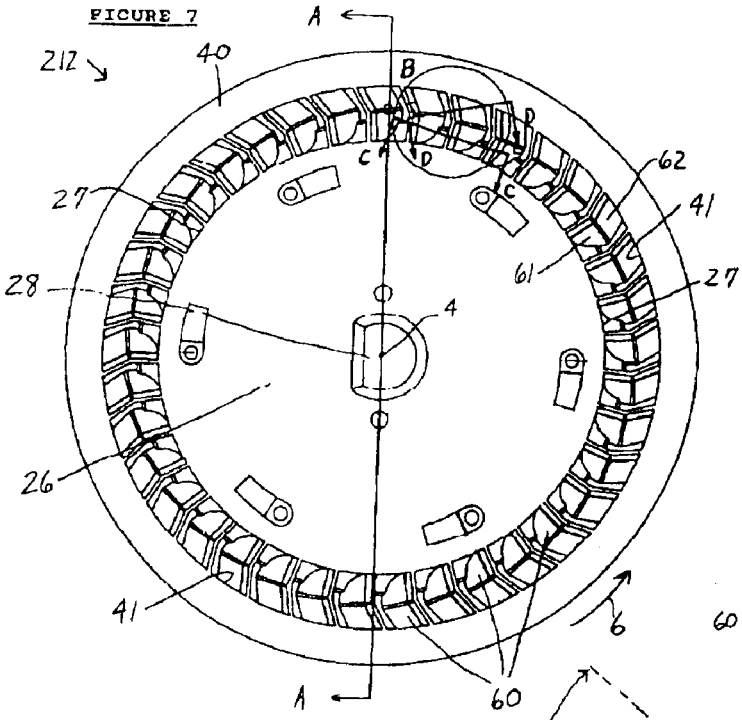
FIG. 7 is a side view of a closed-vane impeller showing the novel dual-angled V-shaped vanes according to a first embodiment of the invention.
Figure 8:
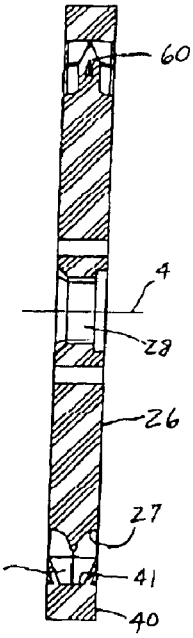
FIG. 8 is a sectional view of the impeller shown in FIG. 7 taken generally along the plane indicated by lines A—A.

Secured to the shaft 20 of motor 18, the impeller 212 is designed to lie within the disk-shaped space 24, with the vanes 60/160 lying between the first and second annular grooves 23a and 23b in annular pump channel 23. This is best suggested by FIG. 5, as viewed in conjunction with FIGS. 7–12 and 13–14. Specifically, the outer sidewalls 61a and 62a (161a and 162a) of each vane 60 (160) will lie adjacent to the first annular groove 23a. Similarly, the second outer sidewalls 61b and 62b (161b and 162b) of each vane 60 (160) will lie adjacent to the second annular groove 23b. Rotation of the impeller 212 moves the V-shaped vanes 60/160 along the annular pump channel 23 in the forward direction 6, shown in FIGS. 7, 9–11 and 13–14. The movement of the vanes 60/160 causes fuel from the fuel tank to be sucked into the inlet port 34 and flow into the annular groove 23a, and thus into the annular pump channel 23 and eventually out of the outlet port 36 in inner plate 22b.

As can be understood in the context of this invention in light of the information provided in background, the movement of the innovative vanes 60/160 imparts momentum to the fuel stream. The vanes 60/160 cause the fuel to whirl about the annular pump channel 23 in a toroidal flow path. This, of course, is characteristic of the regenerative cycle in which the fuel enters the base of each vane 60/160 then flows from the root along entrance portion 61/161 and exit portion 62/162. As it leaves the tip of the exit portion 62/162 and impacts the walls of annular pump channel 23, the fuel is redirected by the walls of the channel 23 in a circular or spiral path back towards the entrance portion 61/161 of the trailing vane 60/160. This cycle is repeated continuously as the impeller 212 rotates, causing the V-shaped vanes 60/160 to impart momentum to the fuel.

Referring now to the first presently preferred embodiment of the invention shown in FIGS. 7–12, the dual-angled V-shaped vanes 60 of impeller 212 are distinctly configured, as compared to the vanes 30 of the prior art impeller 12. Unique to the dual-angled vanes 60, the entrance and exit portions 61 and 62 of each vane are angled with respect to each other. More accurately, the entrance portion 61 of each vane 60 extends linearly outward from the outer surface 27 of hub 26. As best shown in FIG. 9, the entrance portion 61 preferably extends radially outward with respect to the center axis 4 of hub 26. In addition, the exit portion 62 of each vane 60 extends linearly from the entrance portion 61 to the inner surface 41 of outer ring 40. In particular, the exit portion 62 is inclined forward of the entrance portion 61 so as to advance toward the inner surface 41 of outer ring 40 at an exit angle $\theta$. Inclined with respect to the direction of rotation 6 of the impeller, the exit angle $\theta$ lies within a range of 15° to 50°. This is best shown in FIG. 9. Within that range of angles, the tangential velocity of the fuel as it exits the tip of the exit portion 62 is generally characterized by $V_t = R_O \overline{\omega} + V_r \sin\theta$.

Novelty also resides in the trailing corners of the outer sidewalls of the vanes 60. During the manufacturing process, the trailing corners of at least the entrance portion 61 of each vane 60 are chamfered. More specifically, the trailing corners 63a and 63b of each entrance portion 61 are chamfered at a predetermined angle $\beta$ relative to each other, as best shown in FIGS. 10 and 12. This predetermined angle $\beta$ lies within a range of 30° to 90°. Preferably, the predetermined angle $\beta$ is 60°. As measured relative to plane 5, however, the predetermined angle lies within a range of 15° to 45°, with 30° being the preferred valve relative to plane 5.

The trailing corners 64a and 64b of each exit portion 62 of each vane 60 may also be chamfered at the predetermined angle $\beta$. This is best illustrated in FIGS. 9 and 11.

The predetermined angle $\beta$ would ideally be equal to the angle at which the fuel stream approaches each of the outer sidewalls, as the vanes 60 move along the annular pump channel 23. The preferred angle of 60° for the chamfer of the trailing corners has been chosen to match, as closely as possible, the angle at which the fuel enters the base of the outer sidewall of each vane 60. The chamfering of each trailing corner gives each outer sidewall a narrower profile. This minimizes the separation of the fluid fuel stream that occurs behind each vane 60. Consequently, low pressure is less likely to develop behind the fin members of each vane 60. This factor alone means that the stream of fuel loses less energy during each regenerative cycle, as compared to the prior art vanes 30.

Due to the chamfered trailing corners, the narrower profile of each outer sidewall also reduces the surface area against which the fuel stream impacts. This factor also means less energy lost during the regenerative cycle. The chamfers thus yield not only less separation and turbulence of the fuel stream behind each fin member but also a reduction in the force with which the fuel stream impacts the leading corners of each vane. As compared to prior art impellers, the impeller 212 with its chamfered vanes 60 causes the fuel stream to lose significantly less energy during operation of the turbine fuel pump 10.

If it is necessary to further reduce the cost of manufacturing the impeller 212, the trailing corners 64a and 64b of the exit portions 62 need not be chamfered. Merely chamfering the trailing corners 63a and 63b of the entrance portions 61, at the base of the vanes 60, will still yield suitably improved results. That is because the trailing corners 63a and 63b along the edge of each fin member are where the fuel stream enters each V-shaped vane 60 during the regenerative cycle, as the impeller rotates.

Referring now to the second presently preferred embodiment of the invention shown in FIGS. 13–14, the impeller 212 may be equipped with hooked or curved-surfaced V-shaped vanes 160. Unique to this embodiment, the entrance and exit portions 161 and 162 of the vanes 160 are each curved. More specifically, the entrance portion 161 draws away from the outer surface 27 of hub 26 at an entrance angle $\phi$ with respect to the direction of rotation 6 of the impeller. Similarly, the exit portion advances towards the inner surface 41 of outer ring 40 at an exit angle $\phi$ with respect to the direction of rotation 6.

FIG. 13 best illustrates the entrance and exit angles of the vanes 160. The entrance angle $\phi$ preferably lies within a range of [50] *5* to 30°, and the exit angle $\phi$ preferably lies within a range of 15° to 50°. The center portion of each vane 160 is the point at which the entrance and exit portions 161 and 162 meet. A tangent drawn at the center portion of each curved vane 160 is preferably normal to the direction of rotation 6.

The entrance and exit angles and the overall curvature of the V-shaped vanes 160 serve to improve the velocity of the fuel, both radially and tangentially, within the annular pump channel 23. Specifically, the entrance angle $\phi$ serves to reduce the force with which the fuel impacts the root of the vane 160, further minimizing the amount of energy lost from the fuel stream. This reduction in force is generally proportional to the cosine of the entrance angle (i.e., $F \approx m(V_{Blade} \times \text{cosine } \phi) - V_{Fluid}$). It also serves to increase the circulatory (radial) velocity of the fuel. As with the first embodiment, the exit angle $\phi$ serves to increase the tangential velocity with which the fuel exits the tip of the vane 160. The exit angle $\phi$ directs a component of the circulatory velocity towards the tangential direction ($V_{Tan} = V_{Tip} + V_C \text{ sine } \phi$). This increases the angular momentum of the fuel as it flows from the tip of each curved vane 160 into the annular pump channel 23.

As with the dual-angled blades 60 of the first embodiment, the entrance portions 161 of the curved-surfaced vanes 160 are preferably chamfered. In particular, the trailing corners 163a and 163b of each entrance portion 161 are chamfered at the predetermined angle $\beta$ relative to each other, as shown in part in FIG. 13. The trailing corners 164a and 164b of each exit portion 162 may also be chamfered at the predetermined angle $\beta$. This is best illustrated in FIGS. 13 and 14.

Three impellers incorporating the curved-surfaced V-shaped vanes 160 have been tested. Each impeller selected for the test had a width of 3 millimeters (mm) and an outer diameter (i.e., the distance from the center axis 4 to the inner surface 41 of outer ring 40) of 32.75 mm. One impeller had an exit angle of 26°. Another impeller had an exit angle equal to 45°. The third impeller had an exit angle of 45° and trailing corners chamfered at a predetermined angle $\beta$ of 60°. The predicted and actual values of flow rate and hydraulic efficiency for each of these impellers are listed in the following table. The values were based on the impeller operating at 5000 rotations per minute (rpm) at a pressure of 380 kilopascals (kPa) at the outlet port 36 and 0 kPa at the inlet port 34.

Impeller: Width = 3 mm.; Outer Diameter = 32.75 mm.; RPM = 5000; Outlet = 380 kPa; Inlet = 0 kPa

| Exit Angle (Degrees) | Flow Rate-Predicted (Grams/Second) | Flow Rate-Actual (Grams/Second) | Hydraulic Efficiency (Percent) |
|---|---|---|---|
| 26° | 21.5 | 22.7 | 44.6% |
| 45° | 23.9 | 25.0 | 50.1% |
| 45°/60° | 28.0 | | 52.8% |

Expressed in terms of percentage, the hydraulic efficiency is the quotient of the product of the mass flow of the fuel (flow rate) and the pressure at the outlet port 36 (380 kPa) divided by the product of the torque and rotational speed of the shaft 20. It is the ratio of the output energy (energy of the fuel stream at the outlet port 36) and the input energy (the mechanical energy of the rotating shaft 20).

In both of its embodiments, the novel impeller 212 improves substantially upon the prior art impeller 12 discussed in background. It improves the overall mechanical efficiency of the high pressure section of the turbine fuel pump 10. In doing so, however, the impeller 212 still retains a geometry that allows it to be manufactured by conventional injection molding techniques at a relatively low cost. More specifically, the non-linear configuration of each vane 60/160 imparts greater momentum to the fuel, as compared to the design of the prior art vanes, at any given rotational speed of the impeller. In addition, the geometry of the chamfers on the trailing corners of each vane is achieved without adversely affecting either the thickness of the root of each vane or the helical angle of retraction characteristic of the injection molding process used to make the impeller. In other words, the impeller is provided with streamlined vanes in such a way as to not compromise or complicate the injection molding process used to make it.

Testing and analysis has revealed that a regenerative turbine fuel pump equipped with the impeller 212 provides 25% higher head capability not only when the pump 10 is shutoff but also throughout the range of flow with no increase in torque. Moreover, the performance of a regenerative turbine pump 10 equipped with the impeller 212 is greatly improved versus impellers having the prior art V-shaped vanes.

The presently preferred embodiments for carrying out the invention have been set forth in detail according to the Patent Act. Persons of ordinary skill in the art to which this invention pertains may nevertheless recognize various alternative ways of practicing the invention without departing from the spirit and scope of the following claims. Persons who possess such skill will also recognize that the foregoing description is merely illustrative and not intended to limit any of the ensuing claims to any particular narrow interpretation.

Accordingly, to promote the progress of science and the useful arts, we secure for ourselves by Letters Patent exclusive rights to all subject matter embraced by the following claims for the time prescribed by the Patent Act.

We claim:

1. An impeller for a regenerative turbine pump, said impeller comprising:

(a) a hub defining an aperture at a center thereof into which a shaft of said turbine pump is securable to allow said hub to rotate about a center axis therewith, said hub having an outer cylindrical surface;

(b) an outer ring concentric to said hub, said outer ring having an inner cylindrical surface; and (c) a plurality of vanes extending between said outer cylindrical surface of said hub and said inner cylindrical surface of said outer ring with each said vane comprising an entrance portion that extends from said outer cylindrical surface of said hub and an exit portion that extends from a radially outward terminus of said entrance portion to said inner cylindrical surface of said outer ring, each of said vanes (i) having a V-shape of a prespecified angle centered relative to a plane normal to said center axis and (ii) having said entrance portion and said exit portion aligned in a non-linear disposition with respect to one another along a dimension of each of said vanes extending between said outer cylindrical surface of said hub and said inner cylindrical surface of said outer ring along at least one of an upstream face and downstream face of said vane from said entrance portion thereof through said exit portion thereof, said entrance and said exit portions of each said vane each having a pair of outer sidewalls, each of said outer sidewalls of each said entrance portion being chamfered along a trailing corner thereof at a predetermined angle relative to said plane.

2. The impeller claimed in claim 1 wherein each of said outer sidewalls of each said exit portion are chamfered along a trailing corner thereof at said predetermined angle relative to said plane.

3. The impeller claimed in claim 1 wherein said predetermined angle relative to said plane is substantially equal to an angle at which a fuel stream within said turbine pump approaches said outer sidewalls of said entrance portions.

4. The impeller claimed in claim 1 wherein said predetermined angle lies within a range of 15° to 45° relative to said plane.

5. The impeller claimed in claim 4 wherein said predetermined angle is 30° relative to said plane.

6. The impeller claimed in claim 1 wherein said prespecified angle lies within a range of 50° and 130° for said upstream face of said vane.

7. The impeller claimed in claim 6 wherein said prespecified angle is 90° for said upstream face of said vane.

8. The impeller claimed in claim 1 wherein said prespecified angle lies within a range of 80° and 86° for said downstream face of said vane.

9. The impeller claimed in claim 8 wherein said prespecified angle is 82.3° for said downstream face of said vane.

10. The impeller claimed in claim 1 wherein said aperture defined in said hub is notched to permit said impeller to be securely fitted onto said shaft of like shape.

11. An impeller for a regenerative turbine pump, said impeller comprising:

(a) a hub defining an aperture at a center thereof into which a shaft of said turbine pump is securable to allow said hub to rotate about a center axis therewith, said hub having an outer cylindrical surface;

(b) an outer ring concentric to said hub, said outer ring having an inner cylindrical surface; and (c) a plurality of vanes extending between said outer cylindrical surface of said hub and said inner cylindrical surface of said outer ring with each said vane comprising an entrance portion that extends linearly outward from said outer cylindrical surface of said hub and an exit portion that extends linearly from a radially outward terminus of said entrance portion to said inner cylindrical surface of said outer ring, each of said vanes having a V-shape of a prespecified angle centered relative to a plane normal to said center axis with said exit portion of each of said vanes being inclined forward of said entrance portion of each of said vanes so as to advance toward said inner cylindrical surface of said outer ring at an exit angle with respect to a direction of rotation of said impeller, said entrance and said exit portions each having a pair of outer sidewalls, each of said outer sidewalls of each said entrance portion being chamfered along a trailing corner thereof at a predetermined angle relative to said plane.

12. The impeller claimed in claim 11 wherein each of said outer sidewalls of each said exit portion are chamfered along a trailing corner thereof at said predetermined angle relative to said plane.

13. The impeller claimed in claim 11 wherein said predetermined angle relative to said plane is substantially equal to an angle at which a fuel stream within said turbine pump approaches said outer sidewalls of said entrance portions.

14. The impeller claimed in claim 11 wherein said predetermined angle lies within a range of 15° to 45° relative to said plane.

15. The impeller claimed in claim 14 wherein said predetermined angle is 30° relative to said plane.

16. The impeller claimed in claim 11 wherein said prespecified angle lies within a range of 50° and 130° for said upstream face of said vane.

17. The impeller claimed in claim 16 wherein said prespecified angle is 90° for said upstream face of said vane.

18. The impeller claimed in claim 11 wherein said prespecified angle lies within a range of 80° and 86° for said downstream face of said vane.

19. The impeller claimed in claim 18 wherein said prespecified angle is 82.3° for said downstream face of said vane.

20. The impeller claimed in claim 11 wherein said exit angle lies within a range of 15° to 50°.

21. An impeller for a regenerative turbine pump, said impeller comprising:

(a) a hub defining an aperture at a center thereof into which a shaft of said turbine pump is securable to allow said hub to rotate about a center axis therewith, said hub having an outer cylindrical surface;

(b) an outer ring concentric to said hub, said outer ring having an inner cylindrical surface; and (c) a plurality of vanes extending between said outer cylindrical surface of said hub and said inner cylindrical surface of said outer ring with each said vane comprising an entrance portion that extends from said outer cylindrical surface of said hub and an exit portion that extends from a radially outward terminus of said entrance portion to said inner cylindrical surface of said outer ring, each of said vanes having a V-shape of a prespecified angle centered relative to a plane normal to said center axis and being curved with said entrance portion drawing away from said outer cylindrical surface of said hub at an entrance angle with respect to a direction of rotation of said impeller and said exit portion advancing toward said inner cylindrical surface of said outer ring at an exit angle with respect to said direction of rotation, said entrance and said exit portions each having a pair of outer sidewalls, each of said outer sidewalls of each said entrance portion being chamfered along a trailing corner thereof at a predetermined angle relative to said plane.

22. The impeller claimed in claim 21 wherein each of said outer sidewalls of each said exit portion are chamfered along a trailing corner thereof at said predetermined angle relative to said plane.

23. The impeller claimed in claim 21 wherein said predetermined angle relative to said plane is substantially equal to an angle at which a fuel stream within said turbine pump approaches said outer sidewalls of said entrance portions.

24. The impeller claimed in claim 21 wherein said predetermined angle lies within a range of 15° to 45° relative to said plane.

25. The impeller claimed in claim 24 wherein said predetermined angle is 30° relative to said plane.

26. The impeller claimed in claim 21 wherein said prespecified angle lies within a range of 50° and 130° for said upstream face of said vane.

27. The impeller claimed in claim 26 wherein said prespecified angle is 90° for said upstream face of said vane.

28. The impeller claimed in claim 21 wherein said prespecified angle lies within a range of 80° and 86° for said downstream face of said vane.

29. The impeller claimed in claim 28 wherein said prespecified angle is 82.3° for said downstream face of said vane.

30. The impeller claimed in claim 21 wherein said entrance angle lies within a range of 5° to 30° and said exit angle lies within a range of 15° to 50°.

31. The impeller claimed in claim 21 wherein a tangent drawn at a center portion of said vane is normal to said direction of rotation.

*32. An impeller for a regenerative turbine pump, said impeller comprising:*

*a hub having an aperture at about the center thereof, said hub being rotatable about a center axis passing through said aperture, said hub having an outer cylindrical surface;*

*a ring having an inner cylindrical surface, said inner cylindrical surface facing said outer cylindrical surface of said hub; and*

*a plurality of vanes extending between said outer cylindrical surface of said hub and said inner cylindrical surface of said ring, each of said vanes having (i) a V-shape of a first angle relative to a first plane normal to said center axis and (ii) an entrance portion that extends from said outer cylindrical surface of said hub and an exit portion that extends from said entrance portion to said inner cylindrical surface of said ring, at least one of said entrance portion and said exit portion being disposed at a second angle relative to a second plane passing through said center axis and normal to a direction of rotation of said impeller.*

*33. The impeller of claim 32 wherein said entrance portion is curved.*

*34. The impeller of claim 32 wherein said exit portion is curved.*

*35. The impeller of claim 33 wherein said exit portion is curved.*

*36. The impeller of claim 32 wherein said hub further includes a notch at said aperture.*

*37. The impeller of claim 32 wherein said at least one of said entrance portion and said exit portion being disposed at said second angle comprises said entrance portion and said second angle lies within a range of about 5° to about 30°.*

*38. The impeller of claim 32 wherein said at least one of said entrance portion and said exit portion being disposed at said second angle comprises said exit portion and said second angle lies within a range of about 15° to about 50°.*

*39. The impeller of claim 32 wherein said first angle lies within a range of about 50° to about 130° for an upstream face of said vane.*

*40. The impeller of claim 39 wherein said first angle is about 90° for said upstream face of said vane.*

*41. The impeller of claim 32 wherein said first angle lies within a range of about 80° to about 86° for a downstream face of said vane.*

*42. The impeller of claim 41 wherein said first angle is about* 82.3° for said downstream face of said vane.

*43. An impeller for a regenerative turbine pump, said impeller comprising:*

*a hub having an aperture at about the center thereof, said hub being rotatable about a center axis passing through said aperture, said hub having an outer cylindrical surface; and*

*a plurality of vanes extending from said outer cylindrical surface of said hub, each of said vanes having (i) a V-shape of a first angle relative to a first plane normal to said center axis and (ii) an entrance portion that extends from said outer cylindrical surface of said hub and an exit portion that extends outwardly from said entrance portion to a distal end of said vane, each of said entrance portion and said exit portion being chamfered along a trailing segment thereof, at least one of said entrance portion and said exit portion are disposed at a second angle relative to a second plane passing through said center axis and normal to a direction of rotation of said impeller.*

*44. The impeller of claim 43 wherein each of said entrance portion and said exit portion are chamfered along said trailing segment thereof at an angle which lies within a range of about 15° to about 45° relative to said plane.*

*45. The impeller of claim 43 wherein said hub further includes a notch at said aperture.*

*46. The impeller of claim 43 wherein said at least one of said entrance portion and said exit portion being disposed at said second angle comprises said entrance portion and said second angle lies within a range of about 5° to about 30°.*

*47. The impeller of claim 43 wherein said at least one of said entrance portion and said exit portion being disposed at said second angle comprises said exit portion and said second angle lies within a range of about 15° to about 50°.*

*48. The impeller of claim 43 wherein said first angle lies within a range of about 50° to about 130° for an upstream face of said vane.*

*49. The impeller of claim 48 wherein said first angle is about 90° for said upstream face of said vane.*

*50. The impeller of claim 49 wherein said first angle lies within a range of about 80° to about 86° for a downstream face of said vane.*

*51. The impeller of claim 50 wherein said first angle is about 82.3° for said downstream face of said vane.*

*52. An impeller for a regenerative turbine pump, said impeller comprising:*

*a hub having an aperture at about the center thereof, said hub being rotatable about a center axis passing through said aperture, said hub having an outer cylindrical surface; and*

*a plurality of vanes extending from said outer cylindrical surface of said hub, each of said vanes having (i) a V-shape of a first angle relative to a first plane normal to said center axis and (ii) an entrance portion that extends from said outer cylindrical surface of said hub and an exit portion that extends outwardly from said entrance portion to a distal end of said vane, each of said entrance portion and said exit portion being chamfered along a trailing segment thereof, wherein at least one of said entrance portion and said exit portion is curved.*

* * * * *